(12) United States Patent
Sugiyama et al.

(10) Patent No.: US 10,933,619 B2
(45) Date of Patent: Mar. 2, 2021

(54) SHAPING PLATE AND METHOD FOR SHAPING THREE-DIMENSIONAL OBJECT BY USING THE SAME

(71) Applicant: CANON KABUSHIKI KAISHA, Tokyo (JP)

(72) Inventors: Akira Sugiyama, Yokohama (JP); Tomohiro Saito, Utsunomiya (JP); Yukio Hanyu, Isehara (JP); Naotake Sato, Sagamihara (JP); Masahiko Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 15/465,483

(22) Filed: Mar. 21, 2017

(65) Prior Publication Data
US 2017/0274600 A1    Sep. 28, 2017

(30) Foreign Application Priority Data

Mar. 23, 2016 (JP) .............................. JP2016-058808
Mar. 23, 2016 (JP) .............................. JP2016-058809

(51) Int. Cl.
| | |
|---|---|
| *B33Y 10/00* | (2015.01) |
| *B33Y 30/00* | (2015.01) |
| *B29C 64/147* | (2017.01) |
| *B29C 64/40* | (2017.01) |
| *G03G 15/22* | (2006.01) |
| *B33Y 40/00* | (2020.01) |

(52) U.S. Cl.
CPC ............ *B33Y 30/00* (2014.12); *B29C 64/147* (2017.08); *B29C 64/40* (2017.08); *B33Y 10/00* (2014.12); *G03G 15/224* (2013.01); *G03G 15/225* (2013.01)

(58) Field of Classification Search
CPC ....... B29C 64/147; B29C 64/40; B33Y 10/00; G03G 15/224; G03G 15/225
See application file for complete search history.

(56) References Cited

U.S. PATENT DOCUMENTS

| | | | |
|---|---|---|---|
| 2005/0014005 A1 | 1/2005 | Kramer | |
| 2017/0297097 A1* | 10/2017 | Gibson | .................. B33Y 30/00 |

FOREIGN PATENT DOCUMENTS

| | | |
|---|---|---|
| JP | H06-155587 A | 6/1994 |
| JP | 2001-18298 A | 1/2001 |
| JP | 2008225417 A | 9/2008 |
| JP | 2012-97215 A | 5/2012 |
| JP | 2012-224906 A | 11/2012 |
| JP | 2015-071282 A | 4/2015 |
| JP | 2015-180537 A | 10/2015 |
| JP | 2015-180538 A | 10/2015 |

* cited by examiner

*Primary Examiner* — Alexander M Weddle
(74) *Attorney, Agent, or Firm* — Canon U.S.A., Inc. IP Division (57) ABSTRACT

A shaping plate to be set on a shaping stage of a shaping system for performing shaping by an additive manufacturing method includes a water-insoluble base substrate and an underlying layer containing a water-soluble material on at least one surface of the base substrate, wherein the base substrate has a plurality of through holes that extend in the direction intersecting the surface provided with the underlying layer.

16 Claims, 3 Drawing Sheets

SHAPING PLATE AND METHOD FOR SHAPING THREE-DIMENSIONAL OBJECT BY USING THE SAME

BACKGROUND

Field of the Disclosure

The present disclosure relates to a shaping plate used for preparing a three-dimensional object by employing an additive manufacturing method.

Description of the Related Art

In recent years, an additive manufacturing method, in which a shaping material is stacked on the basis of cross-sectional data of a three-dimensional object (object of shaping) that is a target of shaping, has attracted great amounts of attention.

In the additive manufacturing method, a shaped material is formed by stacking a shaping material, on a stage, on the basis of cross-sectional data of an object of shaping. The shaped material on the stage is separated from the stage after shaping is finished.

The stage is a member for constituting a shaping apparatus, and the action of the stage is controlled with accuracy at the level of a thickness of each stacking. If the object of shaping is formed directly on the stage, it is very difficult to remove the shaped material every occasion of shaping without applying a force to the stage such that the action accuracy of the stage is not affected. The shaped material may be deformed due to a force applied to the shaped material during removal.

Japanese Patent Laid-Open No. 2015-071282 discloses that in a shaping method in which shaping is performed by discharging a shaping material toward a stage, a release agent is formed on a shaping surface before stacking of the lowermost shaping material such that the object of shaping is easily removed from the working surface (shaping surface) of the stage after formation is finished. Specifically, a shaping apparatus is provided with a head for discharging the shaping material and the release agent having a property of not adhering to the object of shaping and a support body, and discharges the release agent onto the shaping surface of the stage before the shaping material is discharged so as to form a release layer composed of the release agent. Alternatively, according to the description, an operator may manually coat the shaping surface with the release agent.

Japanese Patent Laid-Open No. 2012-224906 discloses that a shaping plate is detachably fixed to a shaping table (stage) and shaping is performed on the shaping plate. After shaping is finished, the shaping plate is detached from the sage and, thereby, a shaped material integrated with the shaping plate is obtained.

In the method described in Japanese Patent Laid-Open No. 2015-071282, the release agent having a property of not adhering to an object of shaping and a support body is used and, thereby, it becomes difficult to stack a first layer composed of the shaping material so as to adhere to the shaping surface. In the case of the method described in Japanese Patent Laid-Open No. 2012-224906, the shaped material and the shaping plate are integrated with each other and, therefore, it is difficult to separate the shaped material from the shaping plate.

SUMMARY

The present disclosure provides a shaping plate to be set on a shaping stage of a shaping apparatus for performing shaping by an additive manufacturing method, the shaping plate including a water-insoluble base substrate and an underlying layer containing a water-soluble material on at least one surface of the base substrate, wherein the base substrate has a plurality of through holes that extend in the direction intersecting the surface provided with the underlying layer.

According to one embodiment of the present disclosure, a shaped material is easily separated from a shaping plate by removing the shaping plate, on which the shaped material is formed, from a shaping stage after shaping is finished and bringing the shaping plate into contact with a solvent containing water.

Further features of the present disclosure will become apparent from the following description of exemplary embodiments with reference to the attached drawings.

DESCRIPTION OF THE EMBODIMENTS

The present disclosure will be described below in detail with reference to the drawings. Well-known technology or publicly known technology in the related art may be applied to members and steps that are not specifically shown in the drawings or description. In some cases, the same explanations will not be repeated.

The present disclosure relates to a shaping plate used for preparing a three-dimensional object by employing an additive manufacturing method. The additive manufacturing method is a method for preparing a three-dimensional object (object of shaping) that is substantiation of a three-dimensional model by stacking a structural material for constituting the three-dimensional model based on three-dimensional shape data representing the shape of the three-dimensional model that is a target of shaping. Specifically, cross-sectional shape data of the three-dimensional model are formed by slicing the three-dimensional shape data of the three-dimensional model into a plurality of layers in the stacked direction, and the structural material is stacked in accordance with the cross-sectional shape data.

In the case where the three-dimensional model has a hollow structure or an overhang shape and the structural material is stacked in accordance with the cross-sectional shape data of the three-dimensional model, there are circumstances in which the structural material has to be stacked above a space including no structural material. In the case where it is difficult to perform stacking under such circumstances, a support body for assisting stacking of the structural material is disposed, as necessary.

Therefore, in the case where shaping is performed in practice, synthesized data produced by adding, as necessary, cross-sectional shape data of the support body in each cross section to the cross-sectional shape data of the three-dimensional model are used. Hereafter the synthesized data are referred to as slice data.

The support body is a portion to be removed after finishing of shaping and, therefore, has to be composed of a structure or a material that are easily removed from the portion composed of the structural material. In the case where the material constituting the support body is different from the structural material, the material constituting the support body is referred to as a support material. In the case where the structural material and the support material are in no need of being specifically differentiated from each other or these are generically called, these are referred to as shaping material. A portion corresponding to the three-dimensional object that is substantiation of the three-dimensional model is referred to as a structural body so as to be differentiated from the support body. Therefore, the shaped material fabricated by employing the additive manufacturing method includes the structural body and, as necessary, the support body.

Regarding the structural material, various materials may be selected in accordance with the shaping method and the application, the function, the purpose, and the like of the shaped material to be fabricated. In a shaping method in which the shaping material is deposited by using heat during stacking, a thermoplastic resin, e.g., ABS or polypropylene (PP), may be used.

The support body may be composed of the same structural material as the structural body. However, the support body can be composed of a material having a high degree of solubility in a solvent, into which the structural material is not dissolved, in order to facilitate removal of the support body from the structural body. A water-insoluble structural material is used widely and, therefore, a material having thermoplasticity and water solubility can be used as the support material. Examples of such materials include glucide, polylactic acid (PLA), polyvinyl alcohol (PVA), and polyethylene glycol (PEG).

In the case where a water-soluble material is used as the support material, the support body is removed from the structural body by bringing the shaped material into contact with water after shaping is finished. Use of the water as a solvent for removing the support body is very advantageous because a load on the environment is reduced. In addition, use of the water is suitable for shaping a three-dimensional object having a fine structure because application of a physical load to the structural body is unnecessary during removal of the support body.

Shaping Plate

FIGS. 2A to 2E show examples of the shaping plate used in one embodiment of the present disclosure. In FIGS. 2A to 2E, attachment members between the shaping plate and the shaping stage are not shown.

In each of the shaping plates 18, an underlying layer 18a containing a water-soluble material is disposed on a base substrate 18b having a plurality of through holes that extend in the direction intersecting a wide surface to be provided with a shaped material. According to such a configuration, a solvent containing water intrudes through the through holes of the base substrate 18b and, thereby, the surface area of the underlying layer 18a capable of coming into contact with the solvent containing water increases. Consequently, when the shaping plate 18 provided with the shaped material is brought into contact with the solvent containing water after shaping is finished, the solvent containing water intrudes through the through holes so as to dissolve the underlying layer 18a from the surface opposite to the shaping surface as well. As a result, the time required for separation is reduced.

The underlying layer 18a may be shaped by using a shaping apparatus before shaping of the structural body based on the three-dimensional shape data is started. Also, in the case where the shaping plate provided with the underlying layer 18a before being set to the shaping apparatus is prepared, it is unnecessary to form, on the base substrate 18b, a layer for separating the shaped material from the shaping surface at the time of shaping. Consequently, shaping of the structural body based on the cross-sectional shape data can be started smoothly. In the case where the shaping plate provided with the underlying layer 18a in advance is prepared, the water-soluble material contained in the underlying layer 18a adsorbs moisture in the atmosphere and, thereby, the surface may be dissolved. When the shaping plate 18 provided with the underlying layer 18a is stored, the shaping plate 18 can be sealed with a material having low moisture permeability in an atmosphere in which the moisture is reduced.

The base substrate 18b can be composed of a material that does not melt due to the heat applied in a shaping process and, in addition, a material exhibiting small distortion due to the heat. Examples of materials suitable for the base substrate 18b include highly-polymerized materials, e.g., PEEK, polyimide, and ABS, metal materials, e.g., SUS, and ceramic materials, e.g., alumina.

The hole diameter of the through hole is preferably 1 mm or more, and more preferably 5 mm or more. The hole diameter is 5 mm or more and, thereby, the solvent containing water is circulated to the underlying layer 18a. The viscosity of the aqueous solution increases due to the water-soluble material dissolved from the underlying layer 18a. The aqueous solution having increased viscosity is circulated efficiently between the inside and the outside of the hole and, thereby, stagnation in the hole is suppressed. In this regard, the through holes may be formed such that the cross-sectional area, when the through hole is cut parallel to the surface on the shaping surface side, of each of the through holes does not change during shaping in consideration of the material constituting the shaping plate 18. The through holes may be formed such that the density of the through holes does not change during shaping in consideration of the material constituting the shaping plate 18. The distance between the through holes is preferably 20 mm or less, and more preferably 10 mm or less. In the case where the distance is 20 mm or less, the solvent containing water easily uniformly comes into contact with the underlying layer 18a, and the shaped material is removed promptly. In this regard, the distance described here refers to the shortest length between the through holes.

Figure 2A:
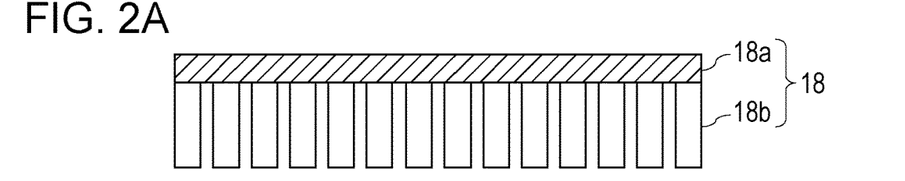
FIGS. 2A to 2E are diagrams showing examples of the configuration of the shaping plate according to one embodiment of the present disclosure.
Figure 2B:
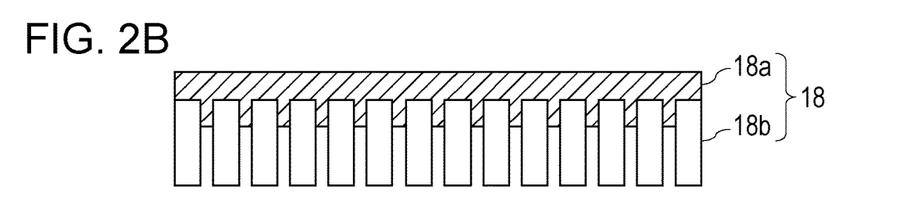

FIG. 2B is different from FIG. 2A in that the underlying layer intrudes inside the through holes of the base substrate. In FIG. 2B, when C denotes the area of the region 18a containing the water-soluble material, in plan view from the shaping surface side, and D denotes the contact area between the base substrate 18b and the region 18a containing the water-soluble material, the relationship represented by $$C<D \qquad (2)$$

is satisfied. It is possible to increase the contact area between the base substrate 18b and the region 18a containing the water-soluble material as long as the relationship represented by formula (2) is satisfied. Further, even when a force toward the shaping surface is applied to the underlying layer, the underlying layer 18a does not easily peel from the base substrate 18b.

Figure 2C:
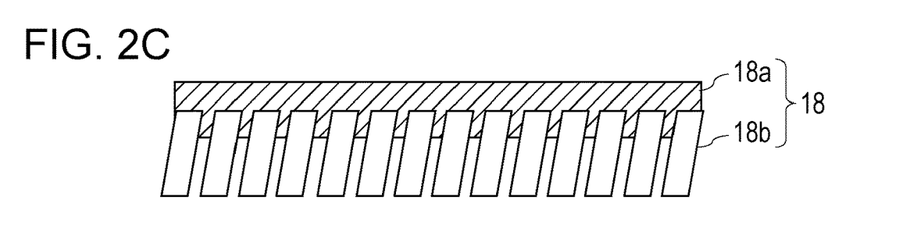

As shown in FIG. 2C, the through holes can be inclined relative to the substrate vertical direction. In the case of such a structure, the same effects as those in the case shown in FIG. 2B are obtained and, in addition, a bonding force between the base substrate 18b and the underlying layer 18a is enhanced so as to compete against a tensile force particularly in the substrate vertical direction.

Figure 2D:
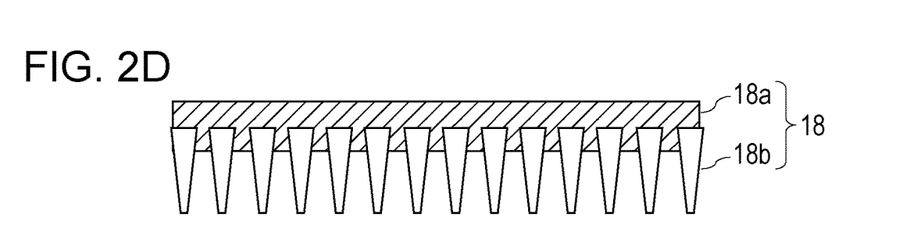

Further, as shown in FIG. 2D, the configuration, in which the hole diameter of the through hole increases from the side near to the shaping surface toward the far side, can be employed. In such a structure, even when a force in the direction, in which the underlying layer is separated from the base substrate 18b, is applied to the underlying layer during shaping, the underlying layer 18a does not easily peel from the base substrate 18b. In addition, the solvent containing water and the aqueous solution including the water-soluble material dissolved are easily circulated compared with the cases shown in FIGS. 2A to 2C, and the region 18a containing the water-soluble material is dissolved in a shorter time. In the case of this configuration, the minimum hole diameter is preferably 1 mm or more.

The underlying layer 18a is firmly fixed to the base substrate 18b by using each of the shaping plates 18 having the structures shown in FIGS. 2A to 2C. Therefore, shaping with high accuracy is realized without an occurrence of positional shift of the shaped material on the shaping plate during shaping.

Figure 2E:
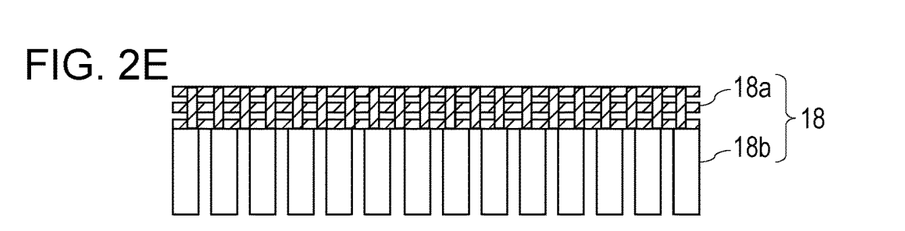

As shown in FIG. 2E, a configuration, in which the underlying layer 18a has an uneven structure, e.g., a three-dimensional mesh structure or a porous structure, on the surface, can be employed because the contact surface between the region containing the water-soluble material and the water increases. The time required for dissolving the region containing the water-soluble material is further reduced by employing such a configuration. However, the three-dimensional mesh structure or the porous structure in the region containing the water-soluble material is in need of having strength so as not to cause deformation or breakdown in the shaping step and, therefore, the structure may be determined in accordance with the additive manufacturing method and the shaping condition.

Water-soluble inorganic materials, water-soluble carbohydrate, e.g., water-soluble dietary fiber and glucide, polyalkylene oxide, polyvinyl alcohol (PVA), and polyethylene glycol (PEG) are suitable for the water-soluble material contained in the underlying layer 18a. Specific examples of water-soluble dietary fiber include simple substances or compounds of polydextrose, inulin, and the like and composites thereof. Specific examples of glucide include sucrose, lactose, maltose, trehalose, melezitose, stachyose, and maltotetraose. Specific examples of polyalkylene oxide include polyethylene glycol (PEG).

The water-soluble material can be a solid from the viewpoint of performing shaping with good accuracy because the weight of the shaped material is supported.

When polyalkylene oxide, PVA, PEG, or the like is dissolved into a solvent containing water, the viscosity increases to a great extent and, thereby, the solvent including such a material dissolved becomes a high-viscosity aqueous solution. Therefore, in the case where the underlying portion is composed of a water-soluble material, e.g., polyalkylene oxide, PVA, PEG, or PLA, the surface of the underlying portion is covered with a high-viscosity aqueous solution at an initial stage after the underlying portion is brought into contact with the solvent containing water. Then, the high-viscosity aqueous solution stagnating on the surface prevents the underlying portion from coming into contact with a new solvent, and the solvent on the surface of the underlying portion becomes close to a saturated aqueous solution. Consequently, dissolution of the underlying portion does not proceed, and some degree of time is required for separation of the shaped material from the shaping surface.

The solubility of the water-soluble material tends to increase as the temperature of the solvent increases. However, if the temperature of heating reaches the deformation temperature or higher than the deformation temperature of the shaped material, there are problems in that, for example, the accuracy is degraded because of deformation of the shaped material and the like. Therefore, prompt dissolution at about ambient temperature (room temperature) is desired.

In particular, the material for forming the underlying layer 18a can be a water-soluble carbohydrate that is a solid at ambient temperature, dissolves into a solvent so as to cause a small increase in viscosity, and has high solubility in water even at ambient temperature. Consequently, the shaped material is stably fixed during shaping, and after shaping is finished, the shaped material is separated from the shaping surface in a shorter time.

The water-soluble material contained in the region 18a containing the water-soluble material may be one type or be a plurality of types. The "type" described here is determined on the basis of a chemical structure, and in the case where the chemical structures are different from each other, the types are assumed to be different from each other.

There is no particular limitation regarding the water-soluble material contained in the underlying layer as long as the material has the water solubility. The solubility of the material in water is preferably more than 1, more preferably more than 5, and further preferably 10 or more.

In the case where the underlying layer is formed by using the water-soluble carbohydrate, in order to fully utilize the excellent solubility of the water-soluble carbohydrate, the content of the water-soluble material other than the water-soluble carbohydrate, in the water-soluble material contained in the underlying layer, is set to be preferably less than 10%, and more preferably 5% or less. This is because the water-soluble material that increases, to a great extent, the viscosity of the aqueous solution contained in the underlying layer hinders dissolution of the water-soluble carbohydrate.

The underlying layer 18a may contain a water-insoluble material. However, if the proportion of the water-insoluble material contained in the underlying layer excessively increases, it becomes difficult to remove the shaping material from the shaping plate. Consequently, the volume ratio of the water-insoluble material relative to the entire underlying layer is preferably less than 50%, and more preferably less than 30%. In other words, in order to ensure the solubility of the underlying layer in the solvent containing water, the mass ratio of the water-soluble material contained in the underlying layer is preferably 50% or more, and more preferably 70% or more. In the case where a plurality of types of water-soluble materials are contained, the total amount of the plurality of types of water-soluble materials may be assumed to be the amount of the water-soluble material contained in the underlying layer.

A material that adjusts the surface characteristics of the shaping surface can be used as the water-insoluble material in accordance with the shaping method, but the water-insoluble material is not limited to this. For example, an elasticity regulator for enhancing the elasticity can be added for the purpose of suppressing an occurrence of cracking in the shaping surface.

A water-insoluble fibrous material (fiber) can be used as the elasticity regulator. A matrix composed of the fiber is formed in the underlying layer by including the fiber and, thereby, the elasticity of the underlying layer is enhanced. Cellulose fiber, aramid fiber, and the like are suitable for the fiber.

Examples of other water-insoluble materials include organic materials typified by organic compounds and highly-polymerized materials, inorganic materials typified by metals and ceramics, and organic-inorganic composite materials containing organic materials and inorganic materials. The water-insoluble material is not limited to these materials.

Specifically, regarding organic materials, resin substances, e.g., acrylic resins, vinyl resins, polyester resins, epoxy resins, and urethane resins, ester compounds, e.g., glycerin fatty acid esters, sucrose fatty acid esters, and sorbitan fatty acid esters, and some of cellulose derivatives, e.g., ethyl cellulose, are suitable for use. Regarding inorganic materials, inorganic oxides, e.g., silicon oxide, titanium oxide, and alumina, are suitable for use. Regarding organic-inorganic composite materials, compounds having a siloxane bond as a main skeleton and having at least one side chain composed of an organic group are used.

A portion not containing a water-soluble material may be present in the underlying layer. Specifically, a water-insoluble material, e.g., a structural material, may be disposed in the underlying layer. In this regard, the area ratio of the region not containing a water-soluble material is preferably less than 40% of the contact area between the underlying layer and a first layer of a structural body, and more preferably less than 30%. In the case where the contact area between a portion containing the water-soluble material of the underlying layer and the first layer of the structural body is 60% or more of the contact area between the underlying layer and the first layer of the structural body, even when part of the structural body is not separated from the shaping plate, it is possible to separate the structural body from the shaping plate by applying a slight force.

The size of the portion not containing the water-soluble material can be set to be within the range in which the structural body is separated from the shaping plate by applying a slight force. If the content of the water-soluble material in the underlying layer 18$a$ is large, the water-soluble material adsorbs moisture in the atmosphere, and the surface may be dissolved. It is considered that such dissolution affects stacking of the shaping material on the shaping surface. Therefore, a protective film may be disposed so as to cover the shaping surface side of the underlying layer, which is present in a shaping region, with a thin water-insoluble material. The protective film may be formed of the material describe as the water-insoluble material. The film thickness can be set such that a portion extending off the shaped material is broken during separation of the shaped material from the shaping plate after shaping is finished. Specifically, the film thickness is preferably 1 nm or more and 10 μm or less, and further preferably 10 nm or more and 1 μm or less. The protective film is in no need of covering the entire surface on the shaping surface side of the region containing the water-soluble material present in the shaping region. At least 30% of the surface area has to be covered, and more preferably at least 40% of the surface area is covered.

First Embodiment

Figure 1:
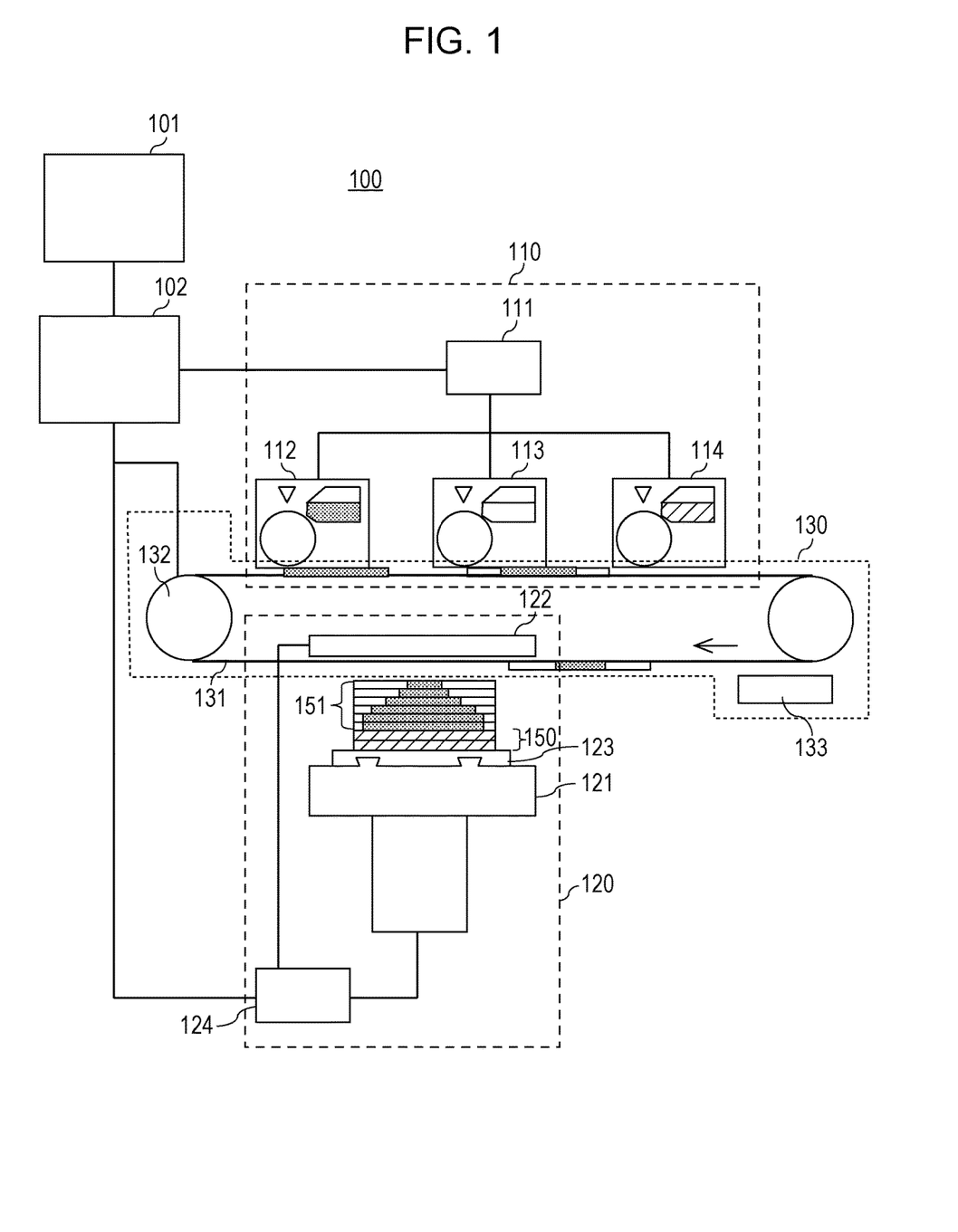
FIG. 1 is a schematic diagram of an example of a shaping system in which a shaping plate according to one embodiment of the present disclosure is used.

In an example described as a first embodiment, a shaping apparatus shown in FIG. 1 is used, and shaping is performed by using a shaping plate provided with an underlying layer containing a water-soluble material. FIG. 1 shows a configuration example of a shaping system, in which a material layer is formed by placing a shaping material in accordance with slice data and, thereafter, stacking is performed on a material layer basis. As a matter of course, shaping is performed in the same manner in shaping systems using other shaping methods including a fused deposition modeling method (FDM method).

A shaping system 100 includes a computer 101, a controller 102, a material-layer-forming portion 110, a shaping portion 120, and a transporting portion 130 for transporting a material layer formed in the material-layer-forming portion 110 to the shaping portion 120.

The material-layer-forming portion 110 includes a first image-forming portion 112, a second image-forming portion 113, and a third image-forming portion 114, which place the shaping material, and a driver unit 111 for driving the first image-forming portion 112, the second image-forming portion 113, and the third image-forming portion 114.

In the form explained here, the first image-forming portion, the second image-forming portion, and the third image-forming portion place different types of materials. However, a form, in which a plurality of image-forming portions place the same type of material, may be employed. In the shown example, the material-layer-forming portion 110 includes three image-forming portions. However, four or more image-forming portions may be included, or a configuration including merely two image-forming portions may be employed. FIG. 1 shows the example in which each of the image-forming portions (112, 113, and 114) includes a material supply unit, a photosensitive member, and a light source and the shaping material is formed by using an electro-photography type, although the configuration is not limited to this. A configuration, in which the material layer is formed by using an inkjet system, can also be employed.

The transporting portion 130 includes a transporting member 131 for carrying the material layer formed in the material-layer-forming portion 110, a driver unit (drive roller) 132 for driving the transporting member 131, and a heating device 133 for heating the material layer. The heating device 133 performs heating such that the material layer is brought into a molten state at the time point when the material layer reaches a stacking position. However, it is not always necessary that the heating device 133 be included in the transporting portion 130. The heating device 133 may be disposed in any form as long as the state, in which the material layer is capable of being stacked on a base substrate 123, is brought about.

The shaping portion 120 includes a shaping stage 121, a counter member 122 facing the shaping stage 121, and a driver unit 124 for driving the shaping stage 121 and the counter member 122. The position between the shaping stage 121 and the counter member 122 is the stacking position at which the material layer is stacked. In the case where the transporting portion 130 includes the heating device, the counter member 122 can be provided with a cooling device. In the case where the transporting portion 130 does not include the heating device, the shaping portion 120 may include the heating device and, for example, the counter member 122 may have both the cooling function and the heating function.

The computer acquires three-dimensional shape data of a three-dimensional model and produce slice data in which a support body is added in accordance with the shape of the three-dimensional model. The resulting slice data are transmitted to the controller 102. The controller 102 transmits signals that are produced on the basis of the slice data received to the driver units 111, 124, and 132 and controls drive of the shaping portion 120, the material-layer-forming portion 110, and the transporting portion 130 so as to form a shaped material on the shaping stage 121.

In order to avoid difficulty in removing the shaped material from the shaping stage 121, after shaping is finished, due to formation of the shaped material directly on the shaping stage 121, a base substrate 123 having a plurality of through holes (not shown in the drawing) is set on the shaping stage 121. Consequently, attachment members for attaching the base substrate 123 are disposed on the shaping surface side of the shaping stage 121, and the base substrate 123 is detachably set.

Next, a method for manufacturing a three-dimensional object according to the present embodiment will be described.

The method for manufacturing a three-dimensional object according to the present embodiment includes the steps of (i) to (iv) below.
(i) Step of producing slice data including cross-sectional data of underlying layer
(ii) Step of forming underlying layer
(iii) Step of forming structural body on underlying layer
(iv) Step of removing underlying layer An example, in which the shaping system shown in FIG. 1 is used, will be sequentially described below.

(i) Step of Producing Slice Data Including Cross-Sectional Data of Underlying Layer The computer 101 acquires three-dimensional shape data of a three-dimensional model and produces cross-sectional shape data of the three-dimensional model by slicing the three-dimensional shape data of the three-dimensional model into a plurality of layers in the stacked direction. Slice data are produced by adding cross-sectional data of a support body that is required in accordance with the shaping characteristics of a shaping system and cross-sectional data of an underlying layer.

The underlying layer is formed so as to include a region in which a first layer of shaping based on the cross-sectional shape data of the three-dimensional model is placed. The underlying layer is formed in a region wider than or equal to the first layer. At this time, a structure capable of ensuring a large contact area with a solvent containing water may be employed. Specifically, the underlying layer can have a three-dimensional network structure. The shaping surface of the underlying layer is in contact with a structural body formed on the underlying layer with a contact area preferably at least 30% of the area of the structural body base, and more preferably at least 50%. In the case where such a contact area is ensured, the shaped material is stably fixed to the underlying layer, and shaping is performed with high accuracy.

If the shape of the shaping surface is not uniform, the shaping accuracy is affected. Therefore, in the case where the underlying layer is formed so as to have a three-dimensional network structure, hole portions are uniformly distributed on the shaping surface of the underlying layer. Specifically, when the proportions of hole portions in a plurality of regions 5 mm square randomly chosen on the shaping surface of the underlying layer were compared, the difference in the proportion falls preferably within the range of ±20%, and more preferably within the range of ±10%.

There is no particular limitation regarding the thickness of the underlying layer as long as the shaped material is removed from the shaping surface. However, the thickness is preferably 0.1 mm or more and more preferably 1 mm or more because it is considered that dissolution due to contact with the solvent containing water proceeds from an exposed surface of the underlying layer. In the case where the thickness of the underlying layer is 0.1 mm or more, a space capable of passing the solvent is located between the shaped material and a shaping plate due to dissolution from the contact portion between the underlying portion and the solvent and, therefore, a removed layer is promptly discharged from the space. As a result, the underlying layer is promptly removed. If the thickness of the underlying layer is excessively large, much time is required for shaping the underlying layer. Therefore, the thickness, that is, the number of layers, may be appropriately determined within the range of 0.1 mm or more in accordance with the shaping rate of a shaping system employed.

(ii) Step of Forming Underlying Layer

The produced slice data are transmitted to the controller 102. The controller 102 produces signals for controlling the shaping stage 121, the material-layer-forming portion 110, and the transporting portion 130 on the basis of the received slice data. The signals produced by the controller 102 are transmitted to the driver units 111, 124, and 132, and the shaping stage 121, the first image-forming portion 112, the second image-forming portion 113, and the third image-forming portion 114 are controlled. In the shaping system shown in FIG. 1, a shaping material is stored in the first image-forming portion 112, a support material is stored in the second image-forming portion 113, and a material for forming the underlying layer is stored in the third image-forming portion 114.

In the present disclosure, initially the underlying layer is shaped on the basis of the slice data. The third image-forming portion 114 is driven by the driver unit 111, and a latent image in accordance with the slice data is formed on the photosensitive member by using the light source. Thereafter, the material for forming the underlying portion is supplied from a material storage unit to the surface of the photosensitive member so as to form the material layer. At this time, the first image-forming portion 112 and the second image-forming portion 113 are on standby because the slice data for shaping the underlying layer do not include data for placing a structural material and the support material.

The material layer formed in the third image-forming portion 114 is placed on the transporting member 131 and is transported toward the stacking position in the direction of an arrow. The material layer is melted by the heating device 133 on the way to the stacking position. The molten material layer is held between the shaping stage 121 and the counter member 122 at the stacking position, is cooled and solidified by the counter member 122, and is stacked on the base substrate 123. In this regard, when the material layer is fixed to the shaping surface, techniques, e.g., adhesion by using a chemical reaction, other than the thermal energy may be utilized.

This step is repeated a plurality of times and, thereby, an underlying layer 150 is formed on the base substrate 123.

The underlying layer is interposed such that shaping based on the cross-sectional shape data of the three-dimensional model is not performed directly on the shaping surface of the shaping plate and is dissolved due to contact with the solvent containing water after shaping is finished. The underlying layer according to the present disclosure can be composed of a material that is dissolved in a short time.

(iii) Step of Forming Structural Body on Underlying Layer

After the underlying layer is formed, a structural body is formed on the underlying layer. At this time, a support body is formed, as necessary. Here, shaping including the support body will be described.

The controller 102 analyzes placement (image) of each of the structural material and the support material among the slice data and drives the first image-forming portion 112 and the second image-forming portion 113 through the driver unit 111. Shaping of the underlying layer has been finished and, therefore, the third image-forming portion 114 is on standby because the data of the underlying layer are not included in the slice data. In this regard, in the case where the placement data of the shaping material or the support material are not contained in the slice data of the layer to be shaped, the image-forming portion for forming the layer composed of the material, the placement data of which are not included, is on standby.

In the first image-forming portion 112, after a latent image in accordance with the placement of the structural material is formed on the photosensitive member by using the light source, the structural material is supplied from the material storage unit to the surface of the photosensitive member so as to form a layer composed of the structural material. Likewise, in the second image-forming portion 113, after a latent image in accordance with the placement of the support material is formed on the photosensitive member by using the light source, the support material is supplied from the material storage unit to the surface of the photosensitive member so as to form a layer composed of the support material.

Subsequently, the layer composed of the shaping material is transferred from the first image-forming portion 112 to the transporting member 131 and is transported toward the second image-forming portion by the transporting member 131 moving in the direction indicated by the arrow.

The controller 102 controls the timing of placement of the layer composed of the support material on the transporting member 131 such that one slice of the material layer, in which the shaping material and the support material are placed in accordance with the slice data, is formed on the transporting member 131. The layer composed of the support material is placed on the transporting member 131 at the timing of arrival of the layer composed of the structural material at a predetermined position so as to form one slice of material layer. The material layer is transported to the stacking position by the transporting member 131 while being heated on the way by the heating device 133 so as to be melted.

The molten material layer is stacked on the underlying layer 150 on the shaping stage 121. At the time of stacking, the underlying layer 150 and the molten material layer are held between the shaping stage 121 and the counter member 122, the molten material layer is cooled and solidified by the counter member 122 and, thereby, the underlying layer 150 and the material layer adhere to each other. Thereafter, the shaping stage 121 and the counter member 122 are separated so as to finish stacking of a layer of material layer. At this time, not only the material layer but also the stacking surface of the underlying layer 150 may be heated. Also, during stacking, a pressure may be applied to the material layer and the underlying layer 150 by the counter member 122 and the shaping stage 121.

Subsequently, in the same manner, a material layer is formed and stacking is performed on the basis of the slice data in the material-layer-forming portion 110. When stacking is completed predetermined times based on the slice data, shaping of the structural body and the support body is finished.

(iv) Step of Removing Underlying Layer

After shaping is finished, the base substrate 123 with the shaped material disposed thereon is removed from the shaping stage 121. The base substrate 123 is detachably set on the shaping stage 121 and, therefore, application of a physical load to the shaped material is suppressed. After the base substrate provided with the shaped material is removed, it is possible to start shaping by setting another base substrate.

The underlying layer 150 is brought into contact with a solvent containing water by showering the solvent containing water on the base substrate 123 removed from the shaping stage 121 or dipping the entirety of base substrate 123 into the solvent containing water. Consequently, the water-soluble material contained in the underlying layer 150 is dissolved into the solvent containing water so as to be removed from the base substrate 123. As a result, the shaped material formed on the underlying layer 150 is separated from the base substrate 123.

In the case where the underlying layer 150 is removed by dipping the entirety of the shaped material into a solvent, the solvent can be fluidized or ultrasonic vibration can be applied to the solvent in accordance with the structure of the shaped material because dissolution or disintegration of the water-soluble material of the underlying layer 150 is facilitated. In this regard, the solvent can be appropriately heated to a temperature at which thermal deformation of the shaped material does not occur.

The base substrate 123, from which the shaped material has been removed, may be recycled. In the case where a material containing the same water-soluble carbohydrate as that in the material for forming the underlying layer 150 is used as the support material, the underlying layer 150 and the support body are removed at the same time and, therefore, the time required for shaping is further reduced.

Second Embodiment

Figure 3:
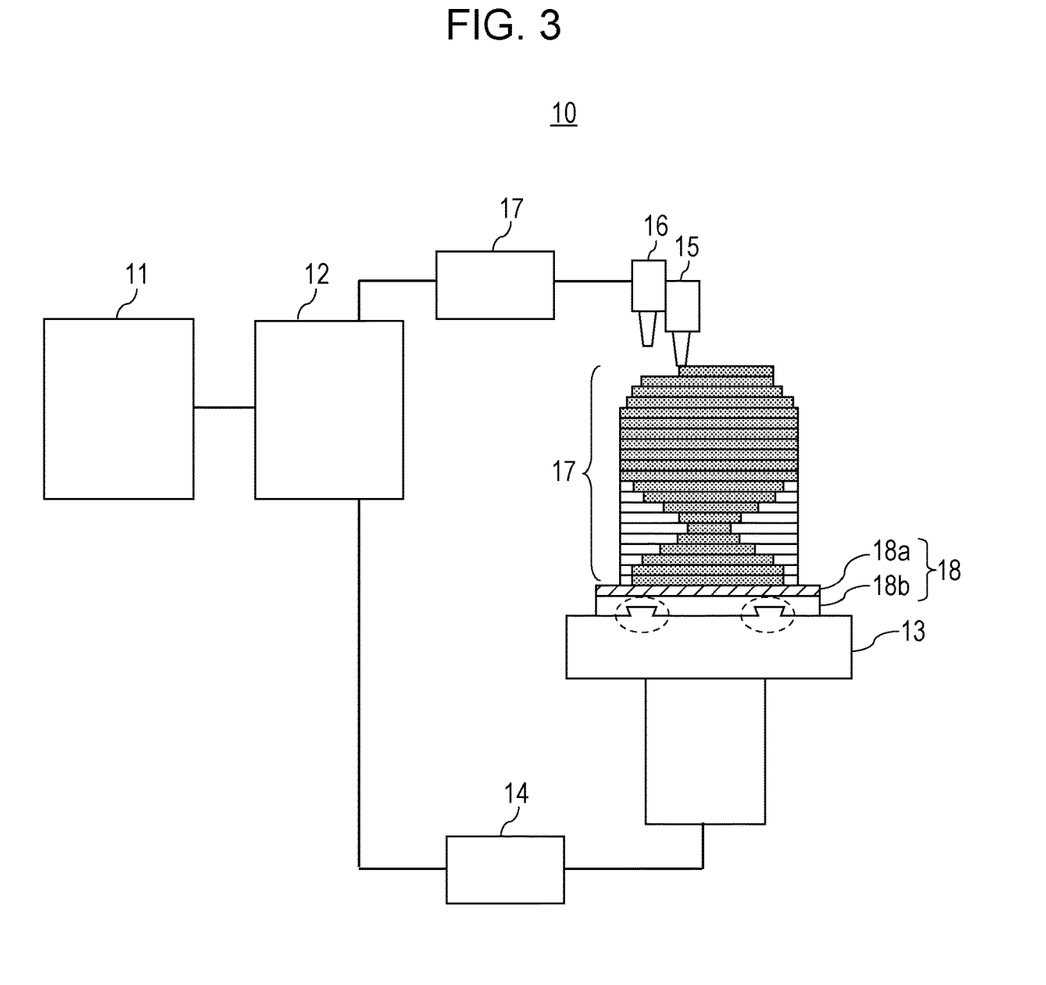
FIG. 3 is a schematic diagram of another example of the shaping system in which the shaping plate according to one embodiment of the present disclosure is used.

In the present embodiment, the case where shaping is performed by using a shaping plate provided with an underlying layer in advance before the shaping plate is set into a shaping apparatus will be described. A material for forming the underlying layer may be melted and put into a mold, and the underlying layer may be formed on at least one surface of a base substrate 18b by bringing the material into contact with the base substrate 18b so as to solidify or performing spin coating. Here, an example, in which a fused deposition modeling method (FDM method) is employed and a shaping system schematically shown in FIG. 3 is used, will be described. The present embodiment may also be applied to the shaping system described in the first embodiment in which the FDM method is employed.

A shaping system 10 includes a computer 11, a shaping controller 12, a shaping stage 13, and a driver unit 14 for driving the shaping stage 13. In addition, a nozzle 15 for discharging a structural material to the shaping stage 13, a nozzle 16 for discharging a support material, and a driver unit 17 for driving the nozzles 15 and 16 are included. FIG. 3 shows the system that shapes a support body by using the support material different from the structural material, but a system that shapes the support body from the structural material without including the nozzle 16 may be used. In this case, it is necessary to devise the structure such that, for example, a portion bonded to the structural body of the support body is made to be thin so as to be easily removed.

The computer acquires three-dimensional shape data of a three-dimensional model and produce slice data in which a support body is added in accordance with the shape of the three-dimensional model and the shaping characteristics of a shaping apparatus used. The resulting slice data are transmitted to the controller 12. The controller 12 transmits signals that are produced on the basis of the slice data to the shaping driver units 14 and 17 and controls the action of the shaping stage 13 and the actions, the material discharge amounts, and the like of the nozzles 15 and 16 so as to form a shaped material on the shaping stage 13.

A shaping plate 18 is set on the shaping stage 13. As described above, if the shaped material is formed directly on the shaping stage 13, it becomes difficult to remove the shaped material from the shaping stage 13 after shaping is finished. Therefore, in the shaping system according to the present embodiment, attachment members for attaching the shaping plate 18 (portions surrounded by dotted lines in the drawing) are disposed on the shaping surface side of the shaping stage 13, and the shaping plate 18 is detachably set. The shaping plate 18 may be set on the shaping stage 13 by using grooves, screws, and the like for fitting.

The shaping plate 18 includes the base substrate 18b and an underlying layer 18a containing a water-soluble material on the surface of the base substrate 18b. The base substrate 18b has the attachment members for being attached to the shaping stage 13, and is set such that the underlying layer 18a serves as a shaping surface.

The base substrate 18b of the shaping plate 18 according to the present disclosure has a plurality of through holes that intersect the surface provided with the underlying layer 18a and extend in the rear direction and has the underlying layer containing a water-soluble material for separating the shaped material from the shaping plate. The underlying layer may be shaped by using a shaping apparatus before shaping of the structural body based on the three-dimensional shape data is started. In the case where the shaping plate provided with the underlying layer is prepared in advance, it is unnecessary to form, on the shaping plate 18, a layer for separating the shaped material from the shaping surface before the shaping. Consequently, shaping of the structural body based on the three-dimensional shape data can be started smoothly.

Further, after shaping is finished, the shaping plate 18 with the shaped material is removed from the shaping stage 13, the underlying layer is brought into contact with the solvent containing water and, thereby, the shaped material is separated from the shaping plate 13 without applying a load to the shaped material. In the case where shaping is performed by using a water-soluble material as the support material, the layer 18a and the support body are more efficiently removed at the same time.

In addition, the base substrate 18b has a plurality of through holes. Consequently, the solvent containing water is brought into contact with the underlying layer 18a from the rear side through the through holes and, thereby, the time required for dissolving the underlying layer 18a is reduced.

Next, a method for manufacturing a three-dimensional object will be described.

The method for manufacturing a three-dimensional object according to the present embodiment includes the steps of (I) to (IV) below.
(I) Step of setting shaping plate on shaping stage
(II) Step of forming shaped material on shaping plate
(III) Step of removing shaping plate provided with shaped material from shaping stage
(IV) Step of bringing underlying layer of shaping plate into contact with solvent containing water In the case where the shaped material produced in step (II) is subjected to step (IV), the produced shaped material is easily separated from the shaping plate, and only the three-dimensional object that is the object of shaping is obtained. Each of the steps will be described below in detail.
(I) Step of Setting Shaping Plate on Shaping Stage The shaping plate is fixed to the shaping stage by utilizing the attachment members disposed on the shaping plate according to the present disclosure and the attachment members of the shaping stage. At this time, fixing is performed such that the relative position of the shaping plate and the shaping stage is not shifted due to vibration and stress during shaping.
(II) Step of Forming Shaped Material on Shaping Plate In the present step, the shaped material is formed on the shaping plate. At this time, the shaped material has to be fixed to the shaping plate.

Adhesion due to thermal energy, chemical reaction, or the like may be utilized for fixing. In particular, fixing can be performed by using thermal energy from the viewpoint of ensuring the flatness at the interface to the substrate. The thermal energy for fixing is uniformly applied to the entire surface.

In order to fix the shaped material to the shaping plate and perform shaping, the adhesion strength between the shaping material and the surface of the underlying layer is important. Therefore, a material exhibiting sufficient strength of adhesion to the shaping material under a common stacking condition can be selected for forming the underlying layer of the shaping plate.

After a first layer is formed, in the same manner as the first layer, stacking of the shaping material is repeated appropriate times in accordance with the slice data so as to fabricate the shaped material.
(III) Step of Removing Shaping Plate Provided with Shaped Material from Shaping Stage After shaping is finished, operations reverse to those in step (I) are performed so as to remove the shaping plate provided with the shaped material from the shaping stage. In the case where the shaping method utilizing the thermal energy is employed, removal can be performed after the temperature of the shaped material is sufficiently lowered.

In the case where the shaped material has a delicate structure, the shaped material may be broken in this step. Therefore, it is desirable that a method for attaching the shaping plate to the shaping stage be sufficiently devised.
(IV) Step of Bringing Underlying Layer of Shaping Plate into Contact with Solvent Containing Water The underlying layer of the shaping plate, removed from the shaping stage, with the shaped material is brought into contact with the solvent containing water.

Specifically, the entirety is dipped into the solvent, or the solvent is spouted like a shower on the shaping plate with the shaped material. In this step, the water-soluble material contained in the underlying layer of the shaping plate is dissolved so as to separate the shaped material from the shaping plate. When the shaped material is separated from the shaping plate, it is unnecessary to apply a strong external force and, thereby, deformation and breakdown of the shaped material are suppressed.

In the case where the shaping plate with the shaped material is dipped into the solvent, the solvent can be fluidized or ultrasonic vibration can be applied to the solvent in accordance with the shape of the structural body because removal of the underlying layer is facilitated. The temperature of the solvent can be appropriately increased to a temperature range in which thermal deformation of the shaped material does not occur.

Experimental Example

Shaping plates having various configurations were fabricated, and the suitability for the shaping plate was evaluated. The experimental examples thereof will be described.

Base Substrate

An ABS substrate of 70 mm×70 mm×10 mm was used as base substrate A.

Shaping Plate 1

A SUS sheet of 70 mm×70 mm having a thickness of 5 mm was shaved so as to fabricate a mold having a recessed portion of 50 mm×50 mm×1 mm. A polytetrafluoroethylene sheet having a thickness of 100 μm was laid in the SUS mold, 2.4 g of polyethylene glycol powder (PEG6000 produced by NOF CORPORATION) was weighed, base substrate A was placed, and heating was performed at 55° C. and a pressure of 12.4 MPa for 10 min so as to produce shaping plate 1.

Shaping Plate 2

After 60 g of maltotetraose (Nisshoku Fujioligo #450 produced by NIHON SHOKUHIN KAKO CO., LTD.) and 26 g of lactitol (Lactitol LC-0 produced by B Food Science Co., Ltd.) were dissolved into 340 g of water, drying and solidification were performed, and the resulting material was pulverized so as to produce powder 1.

After 3.6 g of powder 1 was weighed into a SUS mold in which a polytetrafluoroethylene sheet was laid in the same manner as shaping plate 1, base substrate A was placed, and heating was performed at 120° C. and a pressure of 12.4 MPa for 10 min so as to produce shaping plate 2.

Shaping Plate 3

After 60 g of maltotetraose (Nisshoku Fujioligo #450 produced by NIHON SHOKUHIN KAKO CO., LTD.), 26 g of lactitol (Lactitol LC-0 produced by B Food Science Co., Ltd.), and 15 g of cellulose fiber (CELISH FD200L produced by Daicel FineChem Ltd.) were dissolved into 340 g of water, drying and solidification were performed, and the resulting material was pulverized so as to produce powder 2.

Shaping plate 3 was produced in the same manner as shaping plate 2 except that powder 2 was used instead of powder 1.

Shaping Plate 4

Base substrate B was prepared by locating through holes with a diameter of 5 mm at 20 positions of intersections, excluding the center, of a symmetric lattice, with a pitch of 10 mm, that was disposed in the center region of an ABS substrate of 70 mm×70 mm×10 mm. Shaping plate 4 was produced by the same method as the method for fabricating shaping plate 1 except that base substrate B was used instead of base substrate A. A cross section of the resulting shaping plate 4 was observed. As shown in FIG. 2B, it was ascertained that an underlying layer composed of powder 2 was formed so as to intrude into the through holes partway.

Shaping Plate 5

Shaping plate 5 was produced by the same method as the method for fabricating shaping plate 3 except that base substrate B was used instead of base substrate A and the heating temperature was changed from 120° C. to 90° C. A cross section of the resulting shaping plate 5 was observed. As shown in FIG. 2B, it was ascertained that an underlying layer composed of powder 2 was formed so as to intrude into the through holes partway.

Shaping Plate 6

Base substrate C was prepared by locating, in the same manner as base substrate B, through holes having a hole diameter increasing from one surface toward the other surface in an ABS substrate of 70 mm×70 mm×10 mm. Specifically, the hole diameter was 3 mm on one surface side, and the hole diameter was 5 mm on the other surface side. Shaping plate 6 was prepared in the same manner as shaping plate 5 except that base substrate C was used instead of base substrate B and the heating condition was changed to 120° C., where the underlying layer was formed on the surface on the small hole diameter side. A cross section of the resulting shaping plate 6 was observed. As shown in FIG. 2D, it was ascertained that an underlying layer composed of powder 2 intruded partway into the through holes having a hole diameter increasing from the surface provided with the underlying layer toward the opposite surface.

Shaping Plate 7

Base substrate A was specified as shaping plate 7.

Evaluation of Various Shaping Plates

Each of shaping plates 1 to 7 fabricated was evaluated as described below.

The shaping system shown in FIG. 3 was used, and a process of stacking 100 ABS sheets having a thickness of 10 μm and a diameter of 10 mm on each of shaping plates 1 to 7 under heating and pressurization so as to fabricate a shaped body was performed. Regarding shaping plate 7, the shaped material was firmly fixed to the shaping surface but, after shaping, the shaped material was not able to be separated from the shaping plate.

Regarding each of shaping plates 1 to 6, shaping was finished without peeling of the shaped material from the shaping plate during shaping. The resulting shaped material was separated from the shaping plate by applying running water to the shaping plate with the shaped material.

When shaping plate 1 and shaping plate 2 are compared, the shaped material was separated from shaping plate 2 in a shorter time.

Regarding shaping plate 2, an occurrence of cracking was recognized in part of the surface of the underlying layer, although no cracking was recognized in the other shaping plates.

Regarding shaping plate 3, after shaping was finished and the shaped material was cooled, some parts of the underlying layer peeled from the base substrate, although such peeling did not occur in shaping plates 5 and 6.

In shaping plate 6, the base substrate and the underlying layer firmly adhered to each other compared with the case of shaping plate 5.

Regarding shaping plate 4, the shaped material was removed in a very short time compared with the case of shaping plate 1.

Regarding shaping plates 5 and 6, the shaped materials were removed in very short times compared with the case of shaping plate 3.

As is clear from the above-described examples, regarding each of the configurations of shaping plates 4 to 6 according to the present disclosure, after the shaped material was fixed to the substrate, the shaped material was removed in a short time by using the solvent containing water.

Table collectively shows the configuration of each shaping plate and evaluation results of the shaping performance and the ease of separation.

The shaping performance shows relative evaluation with reference to shaping plate 7. The case where stacking was performed in the same manner as shaping plate 7 was rated as ⊙, and the case where a problem occurred but did not affect shaping was rated as ○.

Regarding the ease of separation, the case where the shaped material was separated from the shaping plate by using the solvent containing water was rated as ○, the case where separation was performed in a relatively short time was rated as ⊙, and the case where separation was not performed was rated as x.

TABLE

| Plate No. | Base substrate Material | Base substrate Structure | Region containing water-soluble material Water-soluble material | Region containing water-soluble material Water-insoluble material | Shaping performance | Ease of separation |
|---|---|---|---|---|---|---|
| 1 | ABS | plate | PEG | none | ⊙ | ○ |
| 2 | ABS | plate | maltotetraose, lactitol | none | ○ | ○ |
| 3 | ABS | plate | maltotetraose, lactitol | cellulose | ○ | ○ |
| 4 | ABS | plate with through holes | PEG | none | ⊙ | ⊙ |
| 5 | ABS | plate with through holes | maltotetraose, lactitol | cellulose | ⊙ | ⊙ |
| 6 | ABS | plate with through holes | maltotetraose, lactitol | cellulose | ⊙ | ⊙ |
| 7 | ABS | none | none | none | ⊙ | X |

As is clear from the above-described results, in the case where the shaping plate including the underlying layer containing the water-soluble material on the shaping surface side of the base substrate having through holes is used, the shape of the shaped material (structural body) is not impaired during separation of the shaped material from the shaping plate and, thereby, a three-dimensional object with high accuracy is produced. Further, a time required for separation is reduced because the solvent containing water intrudes through the through holes of the base substrate 18b.

In addition, the shaped material is separated from the shaping plate by contact with water which is available easily and which is safe and inexpensive. Therefore, the cost can be reduced, high safety can be ensured, and a load on the environment can be reduced.

Also, use of the water is suitable for removal of a shaped material having a fine structure because application of a physical load to the shaped material is unnecessary during separation of the shaped material from the shaping plate.

Exemplary Embodiments

A three-dimensional object was produced by using powder 2 fabricated in the experiment as the material for forming the underlying layer and the support material, using the powder produced by pulverizing ABS (Techno ABS 130 produced by Techno Polymer Co., Ltd.) as the structural material, and using the shaping system shown in FIG. 1. As shown in the schematic diagram of FIG. 1, the underlying layer 150 and the shaped material 151 including the structural body 151M and the support body 151S were formed on the base substrate 123.

Before shaping was started, a powder of ABS was stored in the material storage unit of the first image-forming portion, and powder 2 containing maltotetraose, lactitol, and cellulose fiber was stored in the material storage unit of the third image-forming portion.

The base substrate 123 composed of ABS was set on the stage 121. A material layer having an area larger than the area of the uppermost layer of the structural body 151M was formed in the third image-forming portion, and the material layer was placed on the transporting member 131 and was transported to the shaping portion 120. The material layer was stacked on the base substrate 123 so as to include a region formed by projecting the shaped material 151 on the base substrate 123. The underlying layer 150 composed of powder 2 having a thickness of 1 mm was formed by stacking 100 material layers similarly. Consequently, a shaping plate including the underlying layer 150, which contained the water-soluble material, on the shaping surface of the base substrate 123 having a plurality of through holes was formed.

Subsequently, in accordance with the slice date for fabricating the shaped material 151, a layer composed of the structural material was formed in the first image-forming portion, and a layer composed of powder 2 was formed in the third image-forming portion. After the layer composed of the structural material was placed on the transporting member 131, the layer composed of powder 2 was placed on the transporting member 131 while the position was adjusted to the position of the layer composed of the structural material on the transporting member 131. In this manner, the layer corresponding to one slice of the shaped material was formed on the transporting member 131.

The material layer was transported to the stacking position in the shaping portion 120 by the transporting member 131 and heating was performed by the heating device 133 on the way. The base substrate 123 provided with the underlying layer 150 and the material layer were held between the stage 121 and the counter member 122. Thereafter, the counter member was cooled and the material layer was solidified and, thereby, the material layer was stacked on the underlying layer 150.

Likewise, the material layers, in which the structural material and the support material (powder 2) were placed in accordance with the slice data, were stacked sequentially so as to complete the shaped material 151.

Particle layers, each having a pattern composed of two types of materials, the structural material and powder 2 serving as the support material, were formed and stacked so as to fabricate a shaped material including a structural material portion and a support material portion.

After shaping was finished, the base substrate 123 provided with the underlying layer 150 and the shaped material 151 was dipped into water in a tank. At this time, the water in the tank was fluidized. Consequently, both the underlying layer 150 and the support body 151S were dissolved into the water so as to produce the structural body 151M separated from the base substrate 123.

In the present exemplary example, the underlying layer 150 and the support body 151S were formed by using the same water-soluble material and, thereby, were removed at the same time when the shaped material (structural body) was separated from the base substrate 123. As a result, the production time of the three-dimensional object that was the object of shaping was reduced.

The underlying layer 150 and the support body 151S contained the water-soluble carbohydrate and, therefore, were dissolved into water without increasing the viscosity to a great extent. In addition, dissolution was performed in a short time without the need to increase the temperature of the water in the tank.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-058808 filed Mar. 23, 2016 and No. 2016-058809 filed Mar. 23, 2016, which are hereby incorporated by reference herein in their entirety.

What is claimed is:

1. A method for manufacturing a three-dimensional object that is substantiation of a three-dimensional model by using a shaping apparatus including
   a shaping stage having a surface and having a setting portion for setting a shaping plate on the surface, and
   a shaping portion for stacking a shaping material on the shaping stage in accordance with slice data of the three-dimensional model,
the method comprising the steps of:
   setting the shaping plate on the shaping stage; and
   stacking the shaping material on the shaping plate,
wherein the shaping plate comprises:
   a base substrate made of a water insoluble material; and
   an underlying layer containing a water-soluble material provided at least on a surface on which the shaping material is to be stacked;
   wherein the base substrate has a plurality of through holes that extend in the direction intersecting the surface provided with the underlying layer.

2. The method for manufacturing a three-dimensional object according to claim 1, further comprising the step of bringing the underlying layer into contact with a solvent containing water through the through holes of the shaping plate after repetition of the stacking of the shaping material in accordance with the slice data.

3. The method for manufacturing a three-dimensional object according to claim 1,
   wherein the shaping material contains a structural material for constituting the three-dimensional object and a support material for supporting stacking of the structural material, and
   the underlying layer is formed of the same material as the support material.

4. The method for manufacturing a three-dimensional object according to claim 1, wherein regarding the through hole, the hole diameter at a position far from the surface provided with the underlying layer is larger than the hole diameter at a position near to a shaping surface.

5. The method for manufacturing a three-dimensional object according to claim 1, wherein the minimum hole diameter of the through hole is 1 mm or more.

6. The method for manufacturing a three-dimensional object according to claim 1, wherein the volume ratio of the water-soluble material contained in the underlying layer is 30% or more.

7. The method for manufacturing a three-dimensional object according to claim 1, wherein the underlying layer contains a water-soluble carbohydrate.

8. The method for manufacturing a three-dimensional object according to claim 7, wherein the water-soluble carbohydrate is water-soluble dietary fiber or glucide.

9. The method for manufacturing a three-dimensional object according to claim 8, wherein the glucide is selected from the group consisting of sucrose, lactose, maltose, trehalose, melezitose, stachyose, and maltotetraose.

10. The method for manufacturing a three-dimensional object according to claim 1, wherein the underlying layer contains a water-insoluble material.

11. The method for manufacturing a three-dimensional object according to claim 10, wherein the water-insoluble material is fibrous.

12. The method for manufacturing a three-dimensional object according to claim 11 wherein the water-insoluble material is cellulose fiber or aramid fiber.

13. The method for manufacturing a three-dimensional object according to claim 1, wherein the underlying layer has a mesh structure or a porous structure.

14. The method for manufacturing a three-dimensional object according to claim 1, wherein the base substrate is composed of any one of a polymerized material, a metal material, and a ceramic material.

15. The method for manufacturing a three-dimensional object according to claim 1, wherein an area C of the underlying layer in plan view from the surface, on a shaping side, of the base substrate and an actual contact area D between the base substrate and a region containing the water-soluble material satisfy the relationship represented by $C<D$.

16. The method for manufacturing a three-dimensional object according to claim 1, wherein a region containing the water-soluble material intrudes inside the through holes.

* * * * *